United States Patent
Li

(10) Patent No.: US 11,309,730 B2
(45) Date of Patent: Apr. 19, 2022

(54) SELF-POWERED WEARABLE ELECTRONIC DEVICE

(71) Applicants: Zhejiang Geely Holding Group Co., Ltd., Hangzhou (CN); Zhejiang Geely Automobile Research Institute Co., Ltd., Taizhou (CN)

(72) Inventor: Shufu Li, Hangzhou (CN)

(73) Assignees: ZHEJIANG GEELY HOLDING GROUP CO., LTD., Hangzhou (CN); ZHEJIANG GEELY AUTOMOBILE RESEARCH INSTITUTE CO., LTD., Taizhou (CN)

( * ) Notice: Subject to any disclaimer, the term of this patent is extended or adjusted under 35 U.S.C. 154(b) by 713 days.

(21) Appl. No.: 16/095,359

(22) PCT Filed: Mar. 7, 2017

(86) PCT No.: PCT/CN2017/075881
§ 371 (c)(1),
(2) Date: Oct. 20, 2018

(87) PCT Pub. No.: WO2017/181780
PCT Pub. Date: Oct. 26, 2017

(65) Prior Publication Data
US 2021/0281102 A1 Sep. 9, 2021

(30) Foreign Application Priority Data

Apr. 20, 2016 (CN) .......................... 201610251562.2

(51) Int. Cl.
*H02J 7/32* (2006.01)
*H02J 7/00* (2006.01)
(Continued)

(52) U.S. Cl.
CPC ............ *H02J 7/32* (2013.01); *H02J 7/00308* (2020.01); *H02J 7/35* (2013.01); *H02K 7/1853* (2013.01)

(58) Field of Classification Search
CPC ........ H02K 37/02; H02K 7/1853; H02K 7/32; H02K 7/35; H02K 7/00308; G04C 10/00;
(Continued)

(56) References Cited

U.S. PATENT DOCUMENTS 3,787,783 A * 1/1974 Ketterer ................. G04C 3/067
331/116 M
3,800,523 A * 4/1974 Yamazaki ............... G04F 5/063
368/159
(Continued)

FOREIGN PATENT DOCUMENTS

CN 2684388 Y 3/2005
CN 200953367 Y 9/2007
(Continued)

*Primary Examiner* — Helen Rossoshek
(74) *Attorney, Agent, or Firm* — Cheng-Ju Chiang

(57) ABSTRACT

A self-powered wearable electronic device comprises a rechargeable battery and an automatic power generation device adapted to automatically charge the rechargeable battery. The automatic power generation device comprises a swing lump, an automatic power generation gear driving device, and a micro generator. The micro generator is connected to the rechargeable battery and comprises a permanent magnet rotor, a stator, and a coil which is set on the stator. The permanent magnet rotor comprises a driving gear. The swing lump is fixed with an automatic power generation gear. The automatic power generation gear is meshed with the automatic power generation gear driving device, and the automatic power generation gear driving device is meshed with the driving gear of the permanent magnet rotor.

7 Claims, 7 Drawing Sheets

(51) Int. Cl.
*H02J 7/35* (2006.01)
*H02K 7/18* (2006.01)

(58) Field of Classification Search
CPC .. H02J 37/02; H02J 7/1853; H02J 7/32; H02J 7/35; H02J 7/00308
See application file for complete search history.

(56) References Cited

U.S. PATENT DOCUMENTS

| | | | | |
|---|---|---|---|---|
| 4,644,246 | A * | 2/1987 | Knapen | H02K 37/02 310/75 A |
| 5,113,381 | A * | 5/1992 | Sakamoto | G04C 3/008 368/74 |
| 5,615,179 | A * | 3/1997 | Yamamoto | G04G 17/083 368/281 |
| 5,630,155 | A * | 5/1997 | Karaki | F03G 1/00 322/100 |
| 5,889,736 | A * | 3/1999 | Fujita | G04C 10/04 368/66 |
| 6,244,742 | B1 * | 6/2001 | Yamada | G04C 3/008 368/148 |
| 6,320,822 | B1 * | 11/2001 | Okeya | G04G 19/12 368/66 |
| 6,563,766 | B1 * | 5/2003 | Nakamiya | G04C 10/04 320/162 |
| 6,800,983 | B1 * | 10/2004 | Iijima | G04C 10/00 310/254.1 |
| 6,804,171 | B2 * | 10/2004 | Miyazawa | H02K 7/1853 368/204 |
| 7,102,964 | B2 * | 9/2006 | Fujisawa | G04G 19/08 368/204 |
| 7,742,364 | B2 * | 6/2010 | Hiraga | G04B 19/082 368/80 |
| 8,138,618 | B2 * | 3/2012 | Tseng | H02K 7/1853 290/1 C |
| 8,310,114 | B2 * | 11/2012 | Chang | H02K 7/1853 310/47 |
| 2005/0157867 | A1 * | 7/2005 | Megner | G04R 60/06 379/433.1 |
| 2005/0185517 | A1 * | 8/2005 | Lazaretnik | G04B 37/0083 368/223 |
| 2007/0154336 | A1 * | 7/2007 | Miyazaki | A61M 5/14276 417/474 |
| 2009/0069045 | A1 * | 3/2009 | Cheng | H02J 7/0042 455/556.1 |
| 2011/0113910 | A1 * | 5/2011 | Lee | H02K 7/1853 74/333 |
| 2013/0162060 | A1 * | 6/2013 | Fukushima | G04C 3/143 310/37 |
| 2015/0185703 | A1 * | 7/2015 | Tanaka | G04G 9/06 368/239 |
| 2016/0028264 | A1 | 1/2016 | Bernhard | |
| 2016/0054710 | A1 * | 2/2016 | Jo | G04G 9/0064 715/763 |
| 2016/0117141 | A1 * | 4/2016 | Ro | G06F 3/04817 715/748 |
| 2016/0149417 | A1 * | 5/2016 | Davis | H02J 7/008 320/162 |
| 2016/0324250 | A1 * | 11/2016 | Lin | H02K 7/1861 |
| 2017/0068225 | A1 * | 3/2017 | Chen | G04G 19/00 |
| 2017/0212476 | A1 * | 7/2017 | Iijima | G04C 3/146 |
| 2017/0269557 | A1 * | 9/2017 | Ihara | G04C 10/02 |
| 2017/0300051 | A1 * | 10/2017 | Zhou | B64C 25/32 |
| 2018/0246471 | A1 * | 8/2018 | Takyoh | G04C 3/14 |
| 2018/0287461 | A1 * | 10/2018 | Coman | H02K 11/0094 |
| 2019/0028997 | A1 * | 1/2019 | Inoue | H04W 4/029 |
| 2021/0240139 | A1 * | 8/2021 | Seki | G04C 3/108 |

FOREIGN PATENT DOCUMENTS

| | | |
|---|---|---|
| CN | 101364756 A | 2/2009 |
| CN | 202033848 U | 11/2011 |
| CN | 202183631 U | 4/2012 |
| CN | 102709969 A | 10/2012 |
| CN | 103633925 A | 3/2014 |
| CN | 103944234 A | 7/2014 |
| CN | 104158278 A | 11/2014 |
| CN | 204271875 U | 4/2015 |
| CN | 204305094 U | 4/2015 |
| CN | 204553127 U | 8/2015 |
| CN | 204965023 U | 1/2016 |
| CN | 105392078 A | 3/2016 |
| CN | 105811560 A | 7/2016 |
| JP | H11-295449 A | 10/1999 |
| JP | 2014-119438 A | 6/2014 |
| WO | 2015/167297 A1 | 11/2015 |

\* cited by examiner

US 11,309,730 B2

SELF-POWERED WEARABLE ELECTRONIC DEVICE

The present application is a 35 U.S.C. § 371 National Phase conversion of International (PCT) Patent Application No. PCT/CN2017/075881, filed on Mar. 7, 2017, which is based on and claims priority of Chinese Patent Application No. 201610251562.2, filed on Apr. 20, 2016. The entire disclosure of the above-identified application, including the specification, drawings and claims are incorporated herein by reference in its entirety. The PCT International Patent Application was filed and published in English.

FIELD OF THE INVENTION

The present disclosure relates to electronic technology, and more particularly to a self-powered wearable electronic device.

BACKGROUND OF THE INVENTION

Over the last decade, the rapid improvement of silicon, packaging, integration, battery, wireless, and display technologies has enabled a wide variety of small, portable electronic devices with vastly improved levels of functionality, form factor, and performance. Much of these advances have been driven by the popularity of pocket-sized devices, such as cell phones and MP3 players. These devices now utilize high-resolution color displays, high performance processors, fast and large capacity memories, wireless interconnectivity, and rich user interfaces. However, few of these advanced technologies have crossed over into small wearable devices, such as watches. Because of severe size and battery constraints, wearable electronic devices have had limited functionality and have typically used low power, simplistic electronic displays, such as monochrome LCD or segmented LED. In the past, efforts to incorporate greater performance and functionality into wearable devices have led to large, bulky designs that were awkward to use, expensive, and limited in battery life. To integrate these advanced technologies into wearable form factors, innovation is required, particularly in the area of power management. Therefore it is very important to develop a self-powered wearable electronic device.

SUMMARY OF THE INVENTION

According to one embodiment of the present invention, a self-powered wearable electronic device includes a rechargeable battery and an automatic power generation device adapted to automatically charge the rechargeable battery. The automatic power generation device includes a swing lump, an automatic power generation gear driving device, and a micro generator. The micro generator is connected to the rechargeable battery. The micro generator includes a permanent magnet rotor, a stator, and a coil which is set on the stator. The permanent magnet rotor includes a driving gear. The swing lump is fixed with an automatic power generation gear. The automatic power generation gear is meshed with the automatic power generation gear driving device, and the automatic power generation gear driving device is meshed with the driving gear of the permanent magnet rotor of the micro generator.

Embodiments of the present disclosure may provide several advantages, including but not limited to the following.

The self-powered wearable electronic device provided by the present embodiment can realize that some of the kinetic energy generated by the user during movement is converted into electrical energy for charging the rechargeable battery. When the swing lump swings, the automatic power generation gear driving device is driven by the swing lump and swings together. The automatic power generation gear driving device drives the permanent magnet rotor of the micro generator to rotate, thus, cutting magnetic field lines to generate power for automatically charging the rechargeable battery. So that, the self-powered wearable electronic device can automatically, quickly and effectively charge the rechargeable battery, ensure a long time of work, save energy, and protect environment. And because the automatic power generation device has simple structure, it takes up small space, and is convenient to use and promote.

DETAILED DESCRIPTION OF PREFERRED EMBODIMENTS

To make the objective, the technical solutions and advantages of the present invention more clear and understandable, embodiments of the present disclosure will be described in detail accompanying with figures as follows.

The First Embodiment

Figure 1:
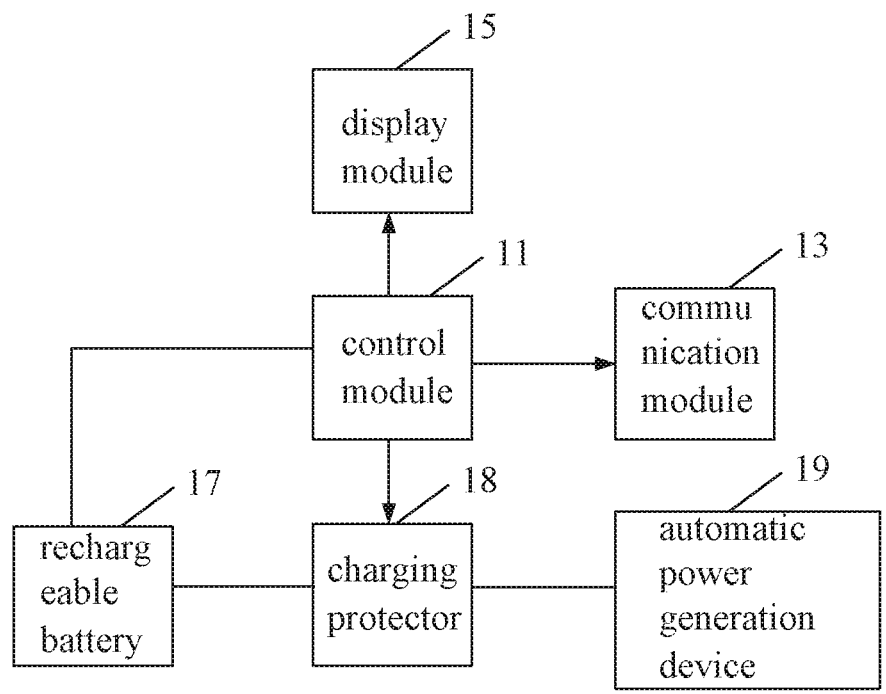
FIG. 1 is a schematic block diagram of a self-powered wearable electronic device in accordance with example embodiments of the present disclosure.
Figure 2:
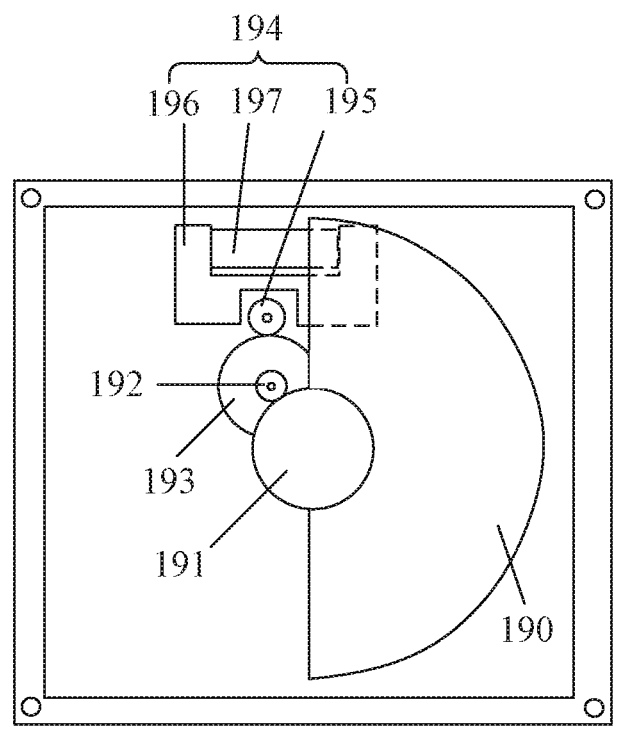
FIG. 2 is a schematic structural diagram of a self-powered wearable electronic device of FIG. 1.
Figure 3:
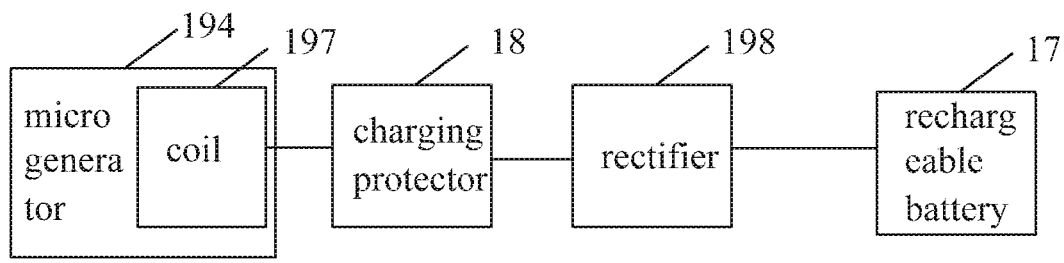
FIG. 3 is a schematic block diagram showing that an automatic power generation device is connected to a rechargeable battery of FIG. 1.

FIG. 1 is a schematic block diagram of a self-powered wearable electronic device in accordance with an exemplary embodiment of the present disclosure. FIG. 2 is a schematic structural diagram of a self-powered wearable electronic device of FIG. 1. FIG. 3 is a schematic block diagram showing that an automatic power generation device is connected to a rechargeable battery of FIG. 1. Referring to FIG. 1, FIG. 2 and FIG. 3, the self-powered wearable electronic device may include a control module 11, a communication module 13, a display module 15, a rechargeable battery 17, and an automatic power generation device 19.

In detail, the communication module 13 is connected to the control module 11, and is configured to communicate with external smart terminals, such as mobile phones, computers, PDAs, vehicle terminals, etc.

The display module 15 is connected to the control module 11, and is configured to display time information, detected physiological parameters of people (such as blood pressure, blood sugar, etc.), remaining power information of the rechargeable battery 17, and communication information between the communication module 13 and the external smart terminals, etc.

The automatic power generation device 19 is configured to automatically charge the rechargeable battery 17.

The rechargeable battery 17 is configured to supply power to corresponding components of the self-powered wearable electronic device.

Preferably, as shown in FIG. 2 and FIG. 3, the automatic power generation device 19 may include a swing lump 190, an automatic power generation gear driving device which includes a first automatic power generation driving gear 192 and a second automatic power generation driving gear 193, and a micro generator 194. The micro generator 194 includes a permanent magnet rotor 195, a stator 196, and a coil 197 which is set on the stator 196. The permanent magnet rotor 195 may include a driving gear which is set on the permanent magnet rotor 195.

Among them, the first automatic power generation gear 192 and the second automatic power generation gear 193 are coaxially fixed. Middle area of the swing lump 190 is fixed with an automatic power generation gear 191. The automatic power generation gear 191 is meshed with the first automatic power generation driving gear 192. The second automatic power generation driving gear 193 is meshed with the driving gear of the permanent magnet rotor 195 of the micro generator 194.

When user carries the wearable electronic device during movement, the swing lump 190 swings. Because the swing lump 190 is fixedly connected to the automatic power generation gear 191, the automatic power generation gear 191 is meshed with the first automatic power generation driving gear 192, the first automatic power generation gear 192 and the second automatic power generation gear 193 are coaxially fixed, and the second automatic power generation driving gear 193 is meshed with the driving gear of the permanent magnet rotor 195, the automatic power generation gear 191 is driven by the swing lump 190 and swings together. Then the automatic power generation gear 191 drives the first automatic power generation gear 192 to rotate, and the second automatic power generation driving gear 193 rotates following the first automatic power generation driving gear 192. The second automatic power generation driving gear 193 drives the permanent magnet rotor 195 of the micro generator 194 to rotate, thereby, cutting magnetic field lines to generate power, an alternating current (AC) voltage generates in the coil 197 which is set on the stator 196. Because swing direction of the swing lump 190 following movement of the user is random, sometimes forward swing, sometimes reverse swing, and AC voltage can be generated no matter how to swing.

Preferably, the self-powered wearable electronic device may also include a rectifier 198 which is connected to the micro generator 194 and the rechargeable battery 17, and the rectifier 198 is connected between the micro generator 194 and the rechargeable battery 17. The rectifier 198 is configured to convert the AC voltage generated by the coil 197 of the micro generator 194 into a direct current (DC) voltage, and supply the converted DC voltage to the rechargeable battery 17 for charging the rechargeable battery 17, so as to realize that some of the kinetic energy generated by the user during movement is converted into electrical energy.

Preferably, the self-powered wearable electronic device may also include a charging protector 18.

The charging protector 18 is connected to the control module 11, the rechargeable battery 17, and the automatic power generation device 19. The charging protector 18 is configured to be turned on according to an open signal output from the control module 11, and be turned off according to a close signal output from the control module 11, so as to open or stop the charging process. In one embodiment, the charging protector 18 can be connected between the micro generator 194 and the rectifier 198.

The control module 11 is also configured to real-timely detect voltage of the rechargeable battery 17, determine whether the detected voltage is greater than or equal to a threshold voltage (the threshold voltage is a set voltage when the rechargeable battery 17 has been completed charging), if the detected voltage is greater than or equal to the threshold voltage, output a close signal to the charging protector 18, in order to stop the charging process, if the detected voltage is not greater than or equal to the threshold voltage, output an open signal to the charging protector 18, to open the charging process. Among them, the rechargeable battery 17 can be a lithium ion battery, etc.

The automatic power generation device 19 is connected to the charging protector 18. When the charging protector 18 is turned on, the rechargeable battery 17 is automatically charged, so the rechargeable battery 17 can be sustainable charged until it reaches the threshold voltage.

The self-powered wearable electronic device provided by the present embodiment can realize that some of the kinetic energy generated by the user during movement is converted into electrical energy for charging the rechargeable battery 17. When the swing lump 190 swings, the automatic power generation gear driving device is driven by the swing lump 190 and swings together. The automatic power generation gear driving device drives the permanent magnet rotor 195 of the micro generator 194 to rotate, thus, cutting magnetic field lines to generate power for automatically charging the rechargeable battery 17. So that, the self-powered wearable electronic device can automatically, quickly and effectively charge the rechargeable battery 17, ensure a long time of work, save energy, and protect environment. And because the automatic power generation device 19 has simple structure, it takes up small space, and is convenient to use and promote.

In addition, when voltage of the rechargeable battery 17 is equal to the threshold voltage, the charging process can be stopped via the charging protector 18, to avoid overcharging phenomenon, thereby, improving safety.

The Second Embodiment

Figure 4:
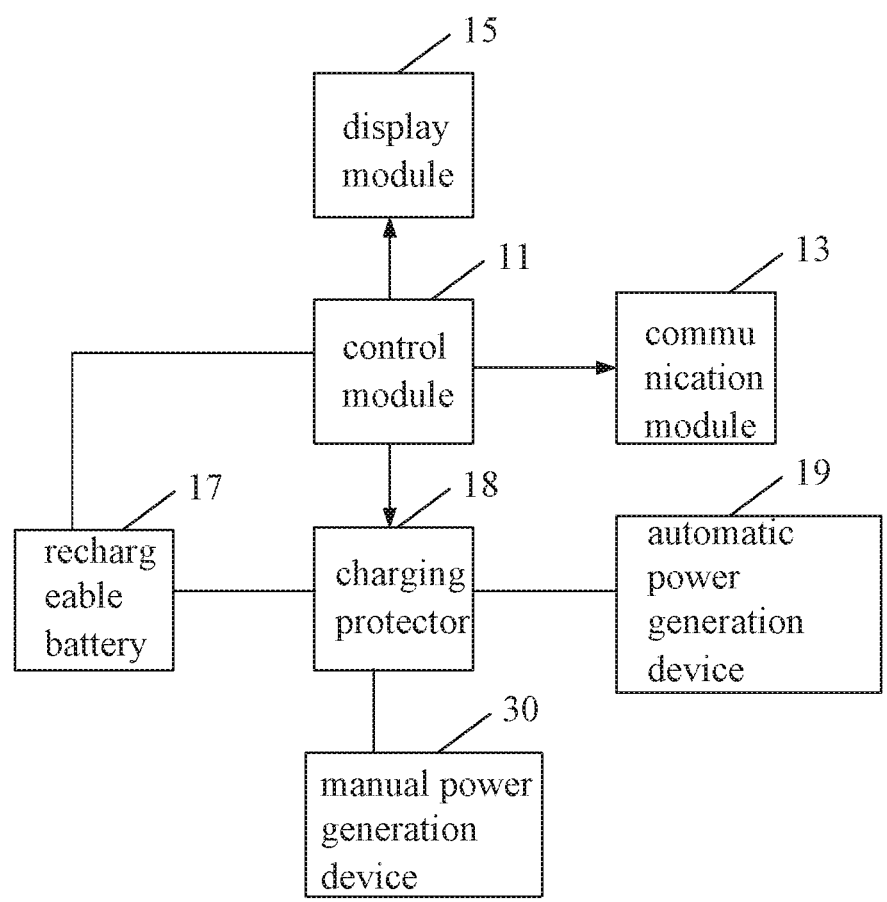
FIG. 4 is a schematic block diagram of a self-powered wearable electronic device in accordance with example embodiments of the present disclosure.
Figure 5:
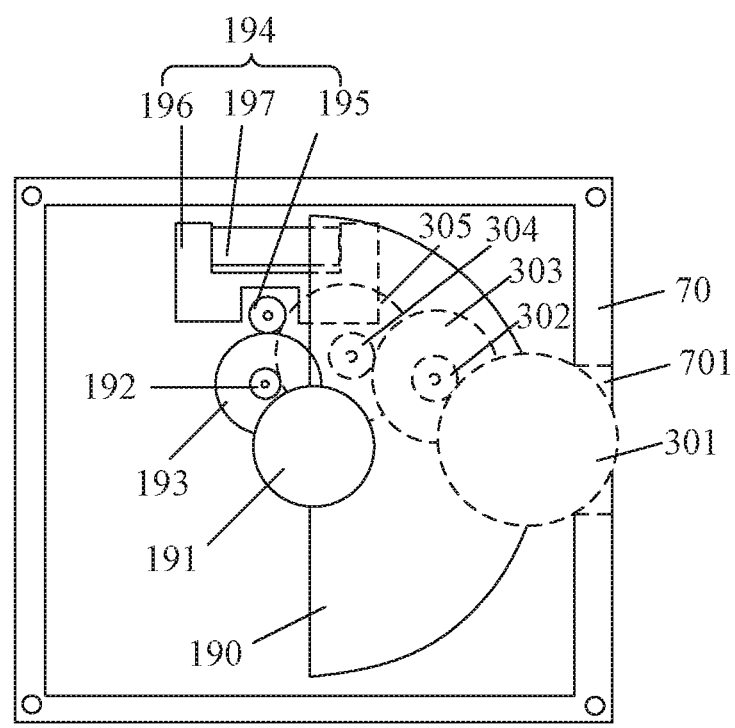
FIG. 5 is a schematic structural diagram of a self-powered wearable electronic device of FIG. 4.

FIG. 4 is a schematic block diagram of a self-powered wearable electronic device in accordance with example embodiments of the present disclosure. FIG. 5 is a schematic structural diagram of a self-powered wearable electronic device of FIG. 4. Referring to FIG. 4 and FIG. 5, the self-powered wearable electronic device further includes a manual power generation device 30 which is connected to the rechargeable battery 17.

Specifically, the manual power generation device 30 is connected to the rechargeable battery 17 via the charging protector 18, and is configured to manually charge the rechargeable battery 17 when the charging protector 18 is turned on.

Specifically, the manual power generation device 30 can include a manual wheel 301, and a manual power generation gear driving device which includes a first manual power generation driving gear 302, a second manual power generation driving gear 303, a third manual power generation driving gear 304, and a fourth manual power generation driving gear 305.

The manual wheel 301 is meshed with the first manual power generation driving gear 302. The first manual power generation driving gear 302 and the second manual power generation driving gear 303 are coaxially fixed. The second manual power generation driving gear 303 is meshed with the third manual power generation driving gear 304. The third manual power generation driving gear 304 and the fourth manual power generation driving gear 305 are coaxially fixed. The fourth manual power generation driving gear 305 is meshed with the driving gear of the permanent magnet rotor 195 of the micro generator 194.

When user turns the manual wheel 301 by hand or other tools, then the manual wheel 301 rotates fast to drive the first manual power generation driving gear 302 and the second manual power generation driving gear 303 rotate fast. Because the second manual power generation driving gear 303 is meshed with the third manual power generation driving gear 304, the third manual power generation driving gear 304 and the fourth manual power generation driving gear 305 are coaxially fixed, the second manual power generation driving gear 303 drives the third manual power generation driving gear 304 and the fourth manual power generation driving gear 305 to rotate. Because the fourth manual power generation driving gear 305 is meshed with the driving gear of the permanent magnet rotor 195 of the micro generator 194, the fourth manual power generation driving gear 305 drives the permanent magnet rotor 195 of the micro generator 194 to rotate, thereby, cutting magnetic field lines to generate power in the micro generator 194, an alternating current (AC) voltage generates in the coil 197 which is set on the stator 196. When the charging protector 18 is turned on, the rectifier 198 converts the AC voltage into a DC voltage, and supplies the converted DC voltage to the rechargeable battery 17 for charging the rechargeable battery 17. When power of the rechargeable battery 17 is too low, such as the self-powered wearable electronic device is placed for a long time without use, the rechargeable battery 17 can be fast charged by this charging method.

Preferably, at least one part of the manual wheel 301 (e.g. edge of the manual wheel 301) exposes from outside of package of the wearable electronic device, so that, user can manually turn the exposed part of the manual wheel 301 to drive the micro generator 194 to generate power by hand.

In addition, the self-powered wearable electronic device can include a package frame 70. The rechargeable battery 17, the automatic power generation device 19 and the manual power generation device 30 can be enclosed in the package frame 70. At least one side edge of the package frame 70 is set a groove 701, outer edge of the manual wheel 301 is in the groove 701 and exposed from the groove 701. Preferably, the outer edge of the manual wheel 301 is not exposed from the package frame 70, that is, the outer edge of the manual wheel 301 is basically aligned with outer side of the package frame 70. So that, as shown in FIG. 5, user's finger can extend into the groove 701 to turn the manual wheel 301. Because the outer edge of the manual wheel 301 is not exposed from the package frame 70, when many system modules 41 are spliced to form a spliced structure (as shown in FIG. 8 to FIG. 11), splicing interference will not occur.

Figure 10:
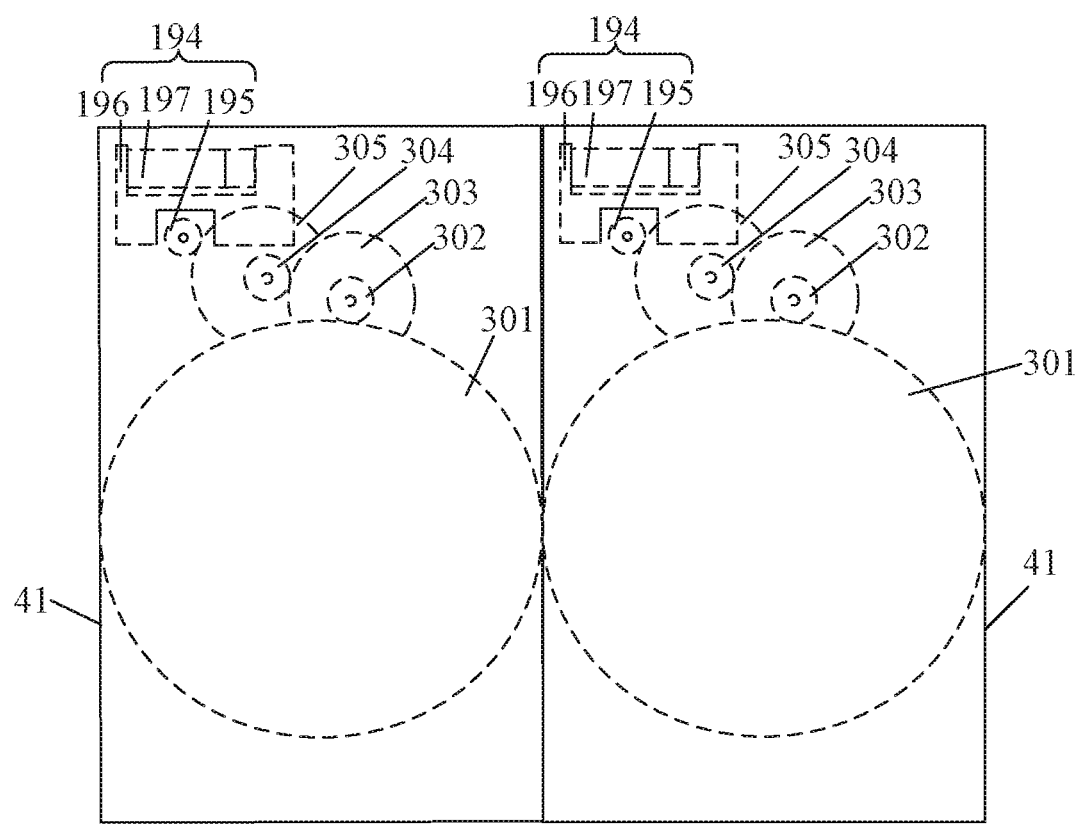
FIG. 10 is a schematic spliced structural diagram of a self-powered wearable electronic device in accordance with example embodiments of the present disclosure.

As an example, two opposite sides of the package frame 70 are respectively set a groove 701, the outer edge of the manual wheel 301 is in each groove 701 and exposes from the two opposite sides of the package frame 70 (as shown in FIG. 10).

Figure 11:
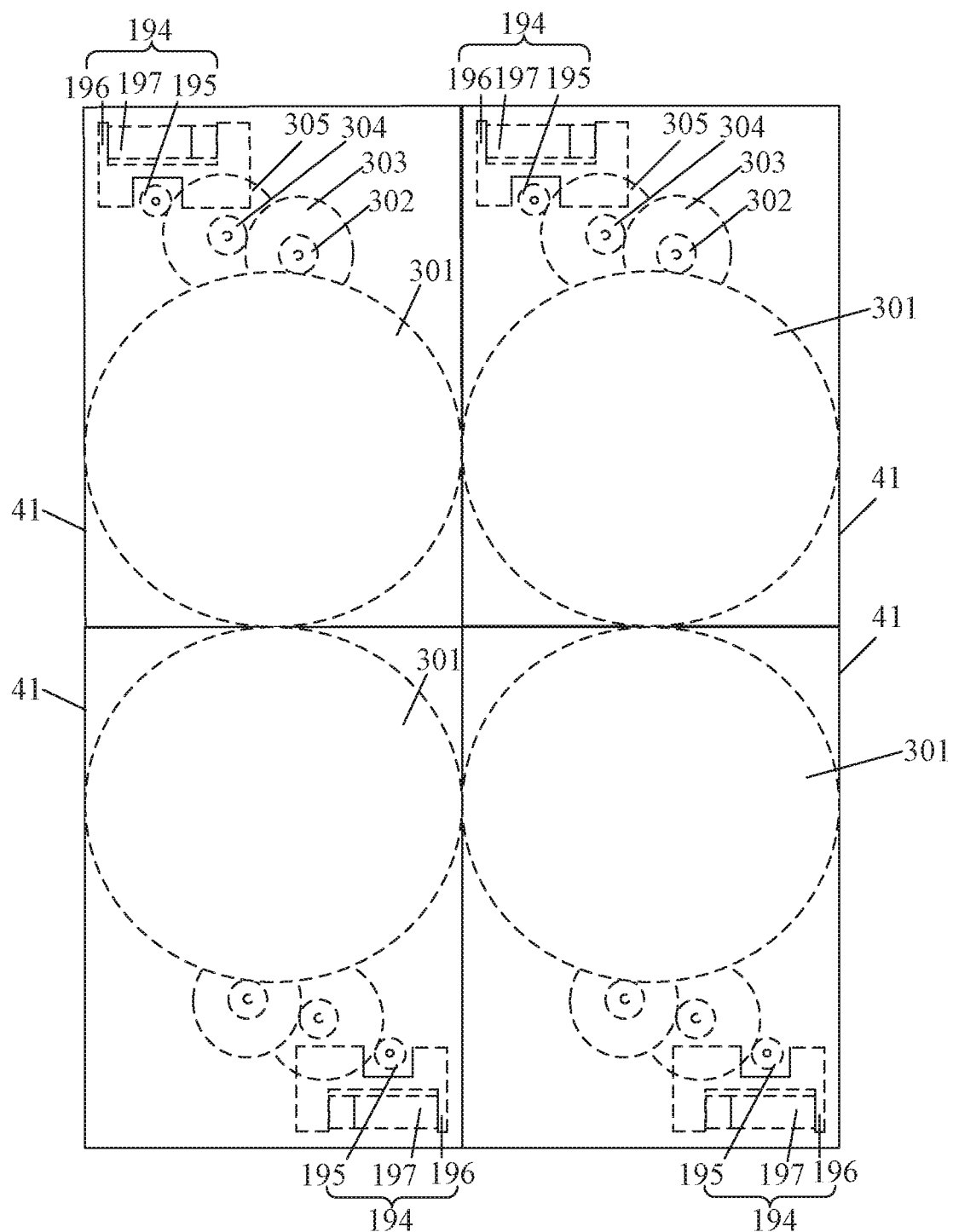
FIG. 11 is a schematic spliced structural diagram of a self-powered wearable electronic device in accordance with example embodiments of the present disclosure.

As another example, three sides of the package frame 70 are respectively set a groove 701, the outer edge of the manual wheel 301 is in each groove 701 and exposes from the three sides of the package frame 70 (as shown in FIG. 11).

If outer edge of the manual wheel 301 exposes from more than one side of the package frame 70, when many system modules 41 are spliced to form a spliced structure (as shown in FIG. 8 to FIG. 11), manual wheels 301 of adjacent system modules 41 can be meshed together.

The self-powered wearable electronic device provided by the present embodiment can manually charge the rechargeable battery 17 via the manual power generation device 30, thereby, when power of the rechargeable battery 17 is too low, such as the self-powered wearable electronic device is placed for a long time without use, the rechargeable battery 17 can be fast charged by this charging method.

The Third Embodiment

Figure 6:
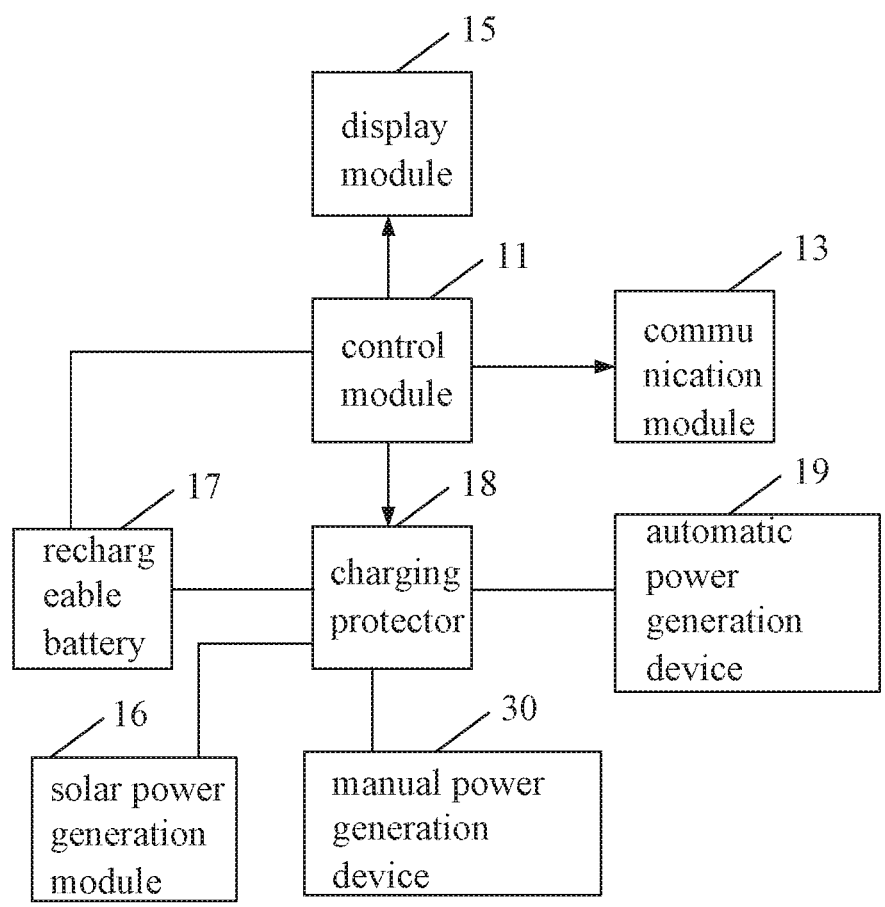
FIG. 6 is a schematic block diagram of a self-powered wearable electronic device in accordance with example embodiments of the present disclosure.

FIG. 6 is a schematic block diagram of a self-powered wearable electronic device in accordance with example embodiments of the present disclosure. Referring to FIG. 6, the self-powered wearable electronic device further includes a solar power generation module 16 which is connected to the rechargeable battery 17.

Specifically, the solar power generation module 16 is connected to the rechargeable battery 17 via the charging protector 18, and is configured to obtain solar energy, convert the obtained solar energy into current, and supply the current to the rechargeable battery 17 when the charging protector 18 is turned on, so as to realize that solar energy is converted into electrical energy to charge the rechargeable battery 17 as an auxiliary method.

The solar power generation module 16 converts solar energy into DC current via solar photovoltaic effect, and supplies the DC current to the rechargeable battery 17. The solar power generation module 16 may include a solar panel. When the self-powered wearable electronic device is a smart watch or a smart bracelet, the solar panel can be set on the outer surface of the self-powered wearable electronic device, such as on the outer surface of the smart watch or the smart bracelet.

The self-powered wearable electronic device provided by the present embodiment can obtain solar energy to charge the rechargeable battery 17 via the solar power generation module 16, so as to realize that solar energy is converted into electrical energy to charge the rechargeable battery 17 as an auxiliary method.

The Fourth Embodiment

Figure 7:
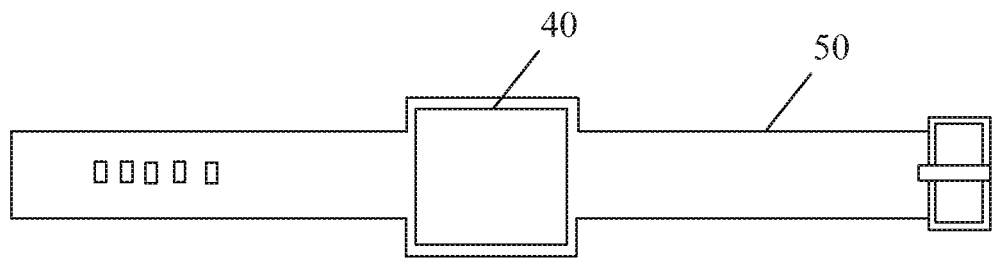
FIG. 7 is a schematic integrated structural diagram of a self-powered wearable electronic device in accordance with example embodiments of the present disclosure.

FIG. 7 is a schematic integrated structural diagram of a self-powered wearable electronic device in accordance with example embodiments of the present disclosure. Referring to FIG. 7, the self-powered wearable electronic device may be a smart watch, a smart bracelet, or other wearable electronic devices. The self-powered wearable electronic device includes a display main body 40 and a belt 50. Components (such as the control module 11, the rechargeable battery 17, the automatic power generation device 19 and the manual power generation device 30) of the self-powered wearable electronic device can be set in the display main body 40, to form an integrated structure. Periphery of the display main body 40 is set a package frame; a display screen can be set in front of the display main body 40 and is configured to display time information, etc.; a package panel can be set on the back of the display main body 40 for packaging. Components of the self-powered wearable electronic device are enclosed in the display main body 40 which the package frame, the display screen, and the package panel form.

The self-powered wearable electronic device provided by the present embodiment can set components of the self-powered wearable electronic device in the display main body 40, to form an integrated structure, thereby, the self-powered wearable electronic device can be made a smart watch, or a smart bracelet to be worn on user's wrist.

The Fifth Embodiment

Figure 8:
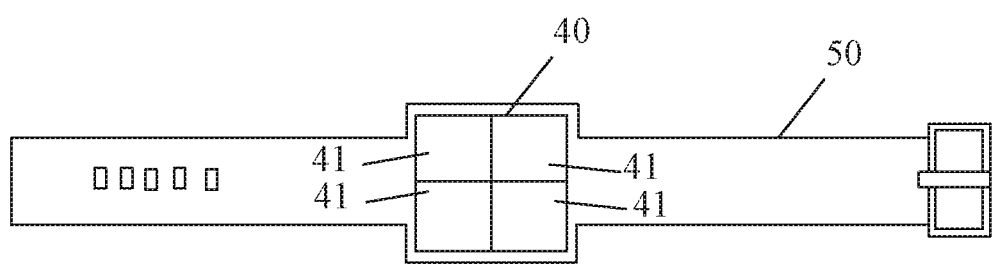
FIG. 8 is a schematic spliced structural diagram of a self-powered wearable electronic device in accordance with example embodiments of the present disclosure.

FIG. 8 is a schematic spliced structural diagram of a self-powered wearable electronic device in accordance with example embodiments of the present disclosure. Referring to FIG. 8, the self-powered wearable electronic device may be a smart watch, a smart bracelet, or other wearable electronic devices. The self-powered wearable electronic device includes a display main body 40 and a belt 50. As shown in FIG. 8, the display main body 40 includes many system modules 41 which are spliced to form a spliced structure. Each system module 41 can be set various components of the self-powered wearable electronic device (such as the control module 11, the rechargeable battery 17, the automatic power generation device 19 and the manual power generation device 30, etc.) to facilitate user to choose several system modules to form the right size by splicing for anyone who wear it, for example, woman can choose small size of the integrated structure as shown in FIG. 7, man can choose big size of the spliced structure as shown in FIG. 8, thereby, meeting demand of convenience of user.

Figure 9:
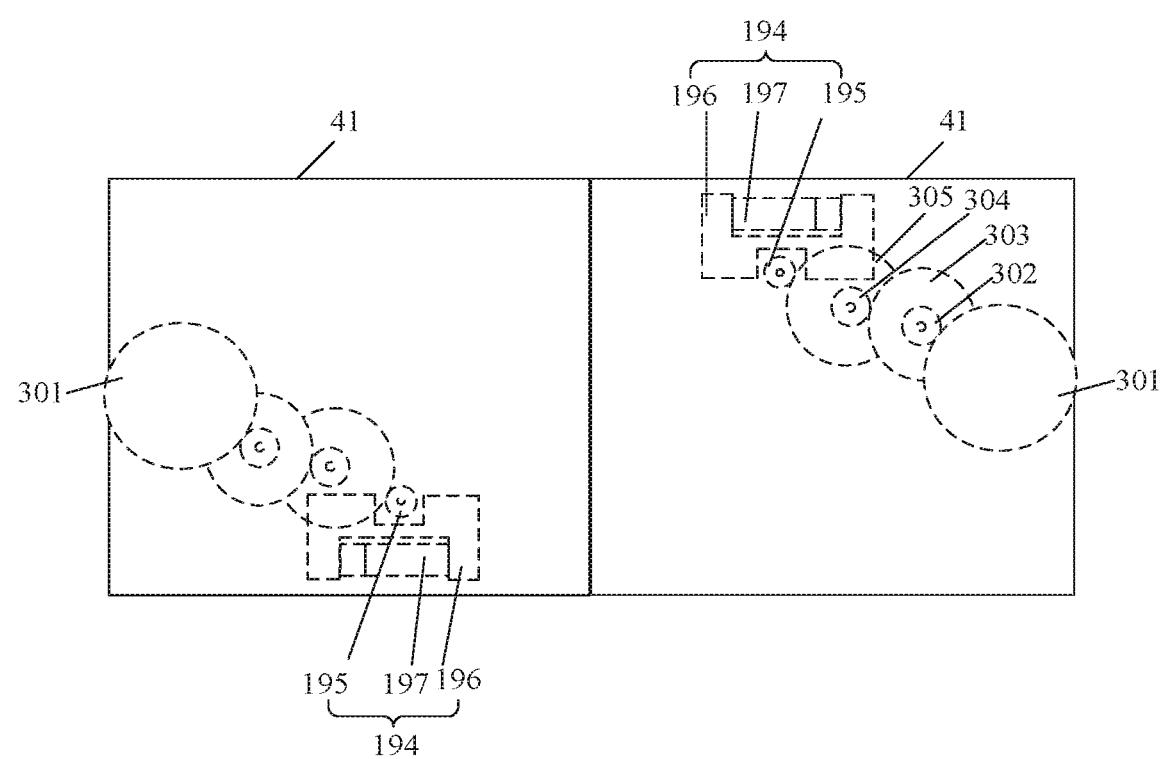
FIG. 9 is a schematic spliced structural diagram of a self-powered wearable electronic device in accordance with example embodiments of the present disclosure.

FIG. 9 is a schematic spliced structural diagram of a self-powered wearable electronic device in accordance with example embodiments of the present disclosure. As shown in FIG. 9, taking two spliced system modules 41 as an example, each system module 41 is set a control module 11, a rechargeable battery 17, an automatic power generation device 19, a manual power generation device 30, etc. In order to make the figure concise, each system module 41 is schematically set a micro generator 194 and a manual power generation device 30. Manual wheel 301 of the manual power generation device 30 in each system module 41 is set on non-spliced side which is not spliced any component, outer edge of the manual wheel 301 exposes from one side of the package frame (non-spliced side), thereby, user can manually turn each manual wheel 301 to drive micro generator 194 to generate power, so as to manually charge rechargeable battery 17 of each system module 41.

FIG. 10 is a schematic spliced structural diagram of a self-powered wearable electronic device in accordance with example embodiments of the present disclosure. Taking two spliced system modules 41 as an example, each system module 41 is set a control module 11, a rechargeable battery 17, an automatic power generation device 19, a manual power generation device 30, etc. In order to make the figure concise, each system module 41 is schematically set a micro generator 194 and a manual power generation device 30. Outer edge of manual wheel 301 in each system module 41 exposes from two opposite sides of the package frame 70, thereby, manual wheels 301 in adjacent system modules 41 can be meshed together via the exposed outer edge. When two system modules 41 are spliced together, user can only turn manual wheel 301 in one of the system module 41, two system modules 41 can be driven for charging, and it is not required to turn manual wheel 301 in each system module 41, and it is not only convenient to charge, but also convenient to splice.

FIG. 11 is a schematic spliced structural diagram of a self-powered wearable electronic device in accordance with example embodiments of the present disclosure. Taking four spliced system modules 41 as an example, each system module 41 is set a control module 11, a rechargeable battery 17, an automatic power generation device 19, a manual power generation device 30, etc. In order to make the figure concise, each system module 41 is schematically set a micro generator 194 and a manual power generation device 30. Outer edge of manual wheel 301 in each system module 41 exposes from three sides of the package frame 70, thereby, manual wheels 301 in adjacent system modules 41 can be meshed together via the exposed outer edge. When four system modules 41 are spliced together, user can only turn manual wheel 301 in one of the system module 41, four system modules 41 can be driven for charging, and it is not required to turn manual wheel 301 in each system module 41, and it is not only convenient to charge, but also convenient to splice.

In addition, many spliced system modules 41 can communicate with each other via communication interface which is set on the self-powered wearable electronic device, thereby, improving calculation speed, storage capacity, and display effects of the self-powered wearable electronic device.

The self-powered wearable electronic device provided by the present embodiment can be spliced to form a spliced structure via many system modules, thereby, facilitating user to choose several system modules to form the right size by splicing for anyone who wear it, and improving performance and display effects.

The above descriptions are only preferred embodiments of the present invention, and are not intended to limit the present invention. Any amendments, replacement and modification made to the above embodiments under the principle of the present invention should be included in the scope of the present invention.

What is claimed is:

1. A self-powered wearable electronic device, comprising:
   a rechargeable battery and an automatic power generation device adapted to automatically charge the rechargeable battery;
   wherein the automatic power generation device comprises a swing lump, an automatic power generation gear driving device, and a micro generator; the automatic power generation gear driving device comprises a first automatic power generation driving gear and a second automatic power generation driving gear, the first automatic power generation gear and the second automatic power generation gear are coaxially fixed; the micro generator is connected to the rechargeable battery, the micro generator comprises a permanent magnet rotor, a stator, and a coil which is set on the stator, the permanent magnet rotor comprises a driving gear; the swing lump is fixed with an automatic power generation gear, the automatic power generation gear is meshed with the first automatic power generation driving gear, the second automatic power generation driving gear is meshed with the driving gear of the permanent magnet rotor of the micro generator;

the self-powered wearable electronic device further comprises a manual power generation device; the manual power generation device is adapted to manually charge the rechargeable battery; the manual power generation device comprises a manual wheel and a manual power generation gear driving device; the manual wheel is meshed with the manual power generation gear driving device, the manual power generation gear driving device is meshed with the driving gear of the permanent magnet rotor of the micro generator;

the self-powered wearable electronic device further comprises a package frame; at least one side edge of the package frame is set a groove, an outer edge of the manual wheel is exposed from the groove;

two opposite sides or three sides of the package frame are respectively set a groove, the outer edge of the manual wheel is in the groove and exposes from the two opposite sides or the three sides of the package frame;

wherein the self-powered wearable electronic device further comprises a display main body; the display main body comprises a plurality of system modules which are spliced to form a spliced structure, each system module is set the rechargeable battery, the automatic power generation device and the manual power generation device, wherein adjacent system modules are meshed together via the manual wheels.

2. The self-powered wearable electronic device as claimed in claim 1, wherein the manual power generation gear driving device comprises a first manual power generation driving gear, a second manual power generation driving gear, a third manual power generation driving gear, and a fourth manual power generation driving gear; the manual wheel is meshed with the first manual power generation driving gear, the first manual power generation driving gear and the second manual power generation driving gear are coaxially fixed, the second manual power generation driving gear is meshed with the third manual power generation driving gear, the third manual power generation driving gear and the fourth manual power generation driving gear are coaxially fixed, the fourth manual power generation driving gear is meshed with the driving gear of the permanent magnet rotor of the micro generator.

3. The self-powered wearable electronic device as claimed in claim 1, wherein the outer edge of the manual wheel is aligned with outer side of the package frame.

4. The self-powered wearable electronic device as claimed in claim 1, wherein the self-powered wearable electronic device further comprises a solar power generation module; the solar power generation module is adapted to obtain solar energy, convert the obtained solar energy into current, and supply the current to the rechargeable battery.

5. The self-powered wearable electronic device as claimed in claim 1, wherein the self-powered wearable electronic device further comprises a control module and a charging protector; the control module is connected to the rechargeable battery and the charging protector, and is adapted to real-timely detect voltage of the rechargeable battery, determine whether the detected voltage is greater than or equal to a threshold voltage, if the detected voltage is greater than or equal to the threshold voltage, output a close signal to the charging protector, if the detected voltage is not greater than or equal to the threshold voltage, output an open signal to the charging protector; the charging protector is connected between the rechargeable battery and each of the automatic power generation device and the manual power generation device; the charging protector is adapted to be turned on according to the open signal output from the control module, and be turned off according to the close signal output from the control module.

6. The self-powered wearable electronic device as claimed in claim 5, wherein the self-powered wearable electronic device further comprises a communication module; the communication module is connected to the control module, and is adapted to communicate with external smart terminals.

7. The self-powered wearable electronic device as claimed in claim 6, wherein the self-powered wearable electronic device further comprises a display module; the display module is connected to the control module, and is adapted to display time information, detected physiological parameters of people, remaining power information of the rechargeable battery, and communication information between the communication module and the external smart terminals.

* * * * *